March 8, 1966     A. R. MYERS     3,238,625
ANGULATOR
Filed July 27, 1964
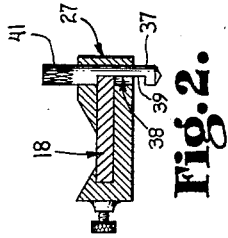
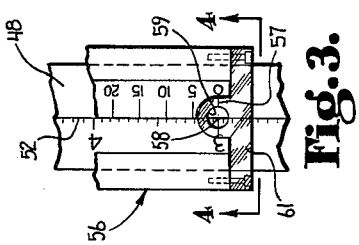
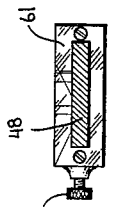
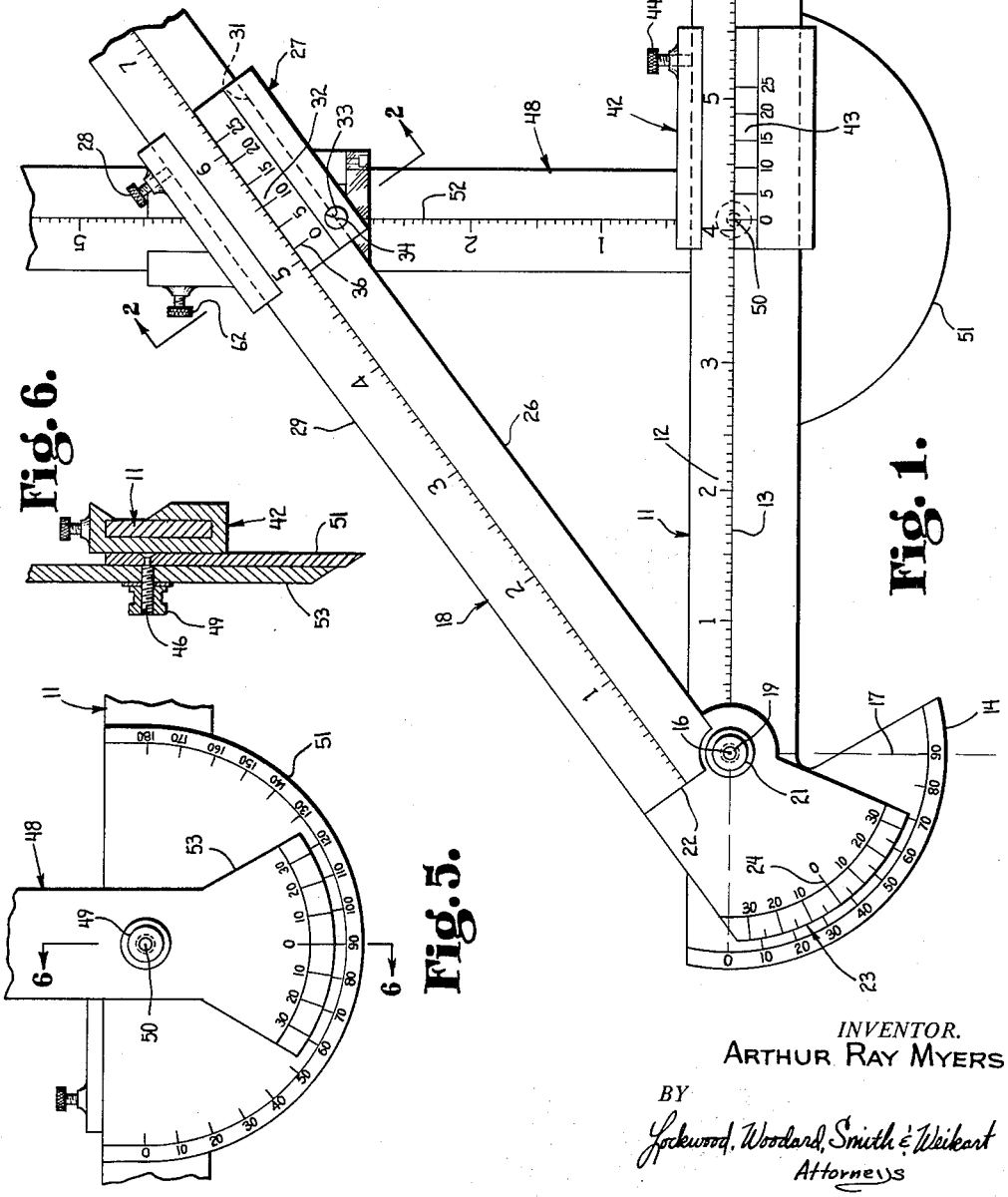
INVENTOR.
ARTHUR RAY MYERS
BY
Lockwood, Woodard, Smith & Weikart
Attorneys

United States Patent Office 3,238,625
Patented Mar. 8, 1966

3,238,625
ANGULATOR
Arthur Ray Myers, 5806 E. 39th St., Indianapolis, Ind.
Filed July 27, 1964, Ser. No. 385,110
6 Claims. (Cl. 33—97)

This invention relates generally to calculating instruments and more particularly to an instrument whereby geometry problems can be worked using known angles or dimensions without the necessity of employing calculations or formulas.

Heretofore, various instruments have been devised for working geometry problems. Most of these require the use of formulas in connection with the instrument in order to obtain the desired results. However, one instrument is known which is intended for use without formulas and that is shown in the patent to De l'Eau, No. 1,117,805 granted November 17, 1914. Unfortunately, however, the device shown in that patent is unsatisfactory because of its bulky and expensive construction and tedious operation.

It is, therefore, the general object of the present invention to provide an instrument for working geometry problems without the use of formulas or calculations.

A further object is to provide an instrument which can be precisely constructed at a comparatively low cost, and can be easily and accurately used.

A still further object is to provide a device which can be employed for finding obtuse angles as well as acute angles.

Described briefly, a typical embodiment of the present invention employs three scale bars, two of which are permanently connected together at a fixed point, and the third one which is pivotally mounted to a slider which is slidable on one of the first two. A slider is employed on each of the second and third bars and a selector pin is movably mounted in one of the sliders at a precise location aligned with the zero line of a vernier thereon. This pin is receivable in an aperture precisely located on the zero line of a vernier on the other slider. Each of the sliders, as well as the pivotal connections of the bars, is provided with means for tightening so as to securely locate the various elements when and where desired.

The full nature of the invention will be understood from the accompanying drawings and the following description and claims.

FIG. 1 is a plan view of a typical embodiment of the invention.

FIG. 2 is a section taken along the line 2—2 in FIG. 1 and viewed in the direction of the arrows, the lower slider and bar of the overlapping two sliders being deleted in order to provide clarity in the illustration.

FIG. 3 is a fragmentary plan view of the lower slider of the overlapping two sliders.

FIG. 4 is a section taken along the line 4—4 in FIG. 3 and viewed in the direction of the arrows.

FIG. 5 is a fragmentary bottom plan view showing the location of the protractor on a movable slider.

FIG. 6 is a section therethrough taken along the line 6—6 in FIG. 5 and viewed in the direction of the arrows.

Referring now to the drawings in detail, a typical embodiment of the present invention employs a first elongated bar 11 of generally rectangular cross section and having a scale 12 thereon, typically divided in fortieths of an inch. The scale markings are preferably provided along a line 13 extending the length of the bar. A protractor 14 is provided at one end of the bar, the center of the protractor being on an axis 16 and the zero line being on the line 13. The 90° line is designated by the reference numeral 17. Typically, the protractor scale is divided into one-half degrees.

A second bar 18 is pivotally mounted to the first bar on the pivotal axis 16, there being a threaded stem 19 affixed to the bar 11, with a knurled nut 21 received on the stem. A suitable spring locking device such as lockwasher or Bellville washer may be employed to provide a friction clutching action as the knurled nut 21 is tightened to thereupon secure the bar 18 with respect to the bar 11 at any desired angular position. It may be mentioned at this point that the line 17, which is the 90° line on the protractor 14, is precisely aligned with the axis 16 and also with the zero marking on the scale of the first bar 11. Likewise, the zero marking 22 of the scale on the bar 18 is aligned with the axis 16.

At the left-hand end of the bar 18 is a one-minute vernier 23, the zero line 24 of which extends through the axis 16 and along the straight flat marginal edge 26 of the bar 18.

A slider 27 is provided around the bar 18 and is slidable therealong. This slider 27 has a rectangular opening therein received on the bar 18 so as to provide a close fit and yet accommodate sliding action. A knurled set screw 28 is provided on the upper marginal edge of the slider 27 to bear upon the edge 29 of the bar opposite the flat marginal edge 26. By tightening this set screw, the flat wall 31 of the opening in the slider 27 can be brought flush in a common plane with the flat marginal edge 26 of the bar.

The slider 27 has a vernier 32 thereon. It also has an aperture 33 with an axis 34 centered on the zero line 36 of the vernier and also on the flat wall 31. This aperture receives the round selector pin 37 having the groove 38 therein. The bottom 39 of groove 38 is on the axis of the pin and is flush with the edge 26 when the slider 27 is secured by the set screw 28. When the slider is so secured, the selector pin 37 is movable along its axis, which is the axis 34, for a purpose which will become apparent. The upper end 41 of the selector pin is knurled to facilitate this movement.

A second slider 42, much like the first slider, is mounted to the bar 11 in the same way. It also has a vernier 43 thereon and set screw 44 for securing the slider on the scale. However, this slider 42 has a post 46 thereon projecting perpendicular to the direction of sliding action of the slider on bar 11. This post serves as the pivotal mounting for the third bar 48. The post 46 has knurled nut 49 threadedly received thereon in the same way as the stem or post 19 on the first bar has the knurled nut 21 received thereon. Also, the spring frictional members are provided to attain the desired tightening action when the threaded nut is tightened. The slider 42 also has mounted thereon a protractor 51 as best shown in FIG. 5. The zero-180° line thereof is centered on the axis 50 which is the axis of the pivotal mounting post 46 for the bar 48. This axis is also aligned with the line 13 of the bar 11 when the slider 42 is secured by tightening the set screw 44. Again, as with the protractor 14, the protractor is divided into one-half degrees.

The front face of the third bar 48 has a scale along the line 52, and the graduations thereon are like those on the bars 11 and 18 and begin with the zero line on the pivotal axis of the bar 48. As shown in FIG. 5, the lower end of the bar is provided with an angle vernier 53 which, as with the vernier 23, is a one-minute vernier. The zero marking and zero line of this vernier is coplanar with the line 52 and the axis 50.

A third slider 56 is provided on the third bar 48 and also has a vernier thereon. The zero line 57 of this vernier is aligned with the center or axis 58 of an aperture 59 in a plate 61 secured to the slider by screws or other suitable means. This aperture 59 is precisely the size of the selector pin 37 and can receive the selector pin readily. The center is also centered on the line 52 of the bar 48 when the set screw 62 is fastened to secure the slider in position on the bar.

From the foregoing description, it is believed apparent that the three bars of the present invention define a triangle having its points on the axes 16, 34, and 50, and having sides colinear with the margin 26 of bar 18 and the line 13 of bar 11 and the line 52 of bar 48. For a triangle, if any three variables thereof are known, the rest of the variables can be determined. For example, in the use of the present invention, assume that a right triangle is to be solved and that the angle alpha is known and the side $b$. The set screw 44 is loosened as are the other set screws 28 and 62. The pin 37 is pulled out so that it is not received in the aperture 58. The knurled nut on the bar 48 is tightened so that the vernier thereon is precisely aligned with the 90° mark on the protractor 51. The knurled nut 21 is tightened once the bar 18 has been moved so that the vernier 23 is precisely aligned with the known angle on the scale of the protractor 14. Then the slider 56 is moved up or down until it is placed at the proper position thereon representing the length of the side $b$. Then the set screw 62 is tightened to secure the slider on the bar 48. Then the sliders 42 and 27 on the bars 11 and 18, respectively, are moved until the pin 37 can be pushed into the aperture 58 of the slider 56. When these sliders are so positioned, the verniers thereon can be read and the lengths of the other two sides of the triangle are then immediately known. Thus it is seen that a triangle can be solved directly without the use of tables and formulas or calculations.

From the foregoing description, it should be apparent that any triangle can be solved so long as two sides and an angle or two angles and a side or, of course, three angles or three sides. To find the angles of a small triangle, they can be multiplied as many times as desired to enable easy reading of the verniers. When answers are derived from the verniers, they can be divided by the same factor as the initial values were previously multiplied to determine the answer. Typically, the factor employed is 10, and in this way is is only necessary to move decimal points, further avoiding calculations. Typically, the vernier employed for the linear scales of the bars is one by which readings in the thousandths of an inch can be obtained.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. An angulator comprising:

a first elongated bar of rectangular cross section having a graduated scale thereon;

a protractor affixed to said bar and having a zero angle line disposed parallel to the direction of increasing values on said scale and having a 90° angle line perpendicular thereto and intersecting the zero angle line at the center of the protractor, said protractor and bar scale being on parallel flat upper faces of said protractor and bar;

a second elongated bar having a graduated scale thereon and having an angle vernier thereon cooperating with said protractor;

first pivotal mounting means pivotally mounting said second bar to said first bar, the first pivotal axis thereof being perpendicular to the planes of said scales and intercepting the center line of said angle vernier and the center of said protractor, said pivotal mounting means including a pivot screw affixed to said first bar and a threaded knurled nut threadedly received thereon engaging a spring friction clutch means to affix said first two bars in any angular relationship desired, said second bar having a straight flat marginal edge thereon lying in a plane containing said first pivotal axis, the scale graduations on said second bar beginning at zero on a line intersecting said pivotal axis and perpendicular to said edge;

a first slider having an aperture therethrough of rectangular cross section and slidingly received on said second bar, said first slider having a vernier thereon cooperating with the scale on said second bar and having an aperture therethrough having its axis on the zero line of the vernier of said slider and coplanar with said marginal edge of said second bar;

a pin extending through said aperture and slidingly received therein, said pin having a groove therein permitting movement of said slider with the pin therein linearly along said second bar, and said groove and second bar being of thicknesses permitting limited axial movement of said pin in said slider at all positions of said slider on said bar;

and a knurled set screw threadedly received in said slider and bearing on the edge of said second bar opposite said flat marginal edge to secure said slider in any desired position on said second bar and locate the axis of said pin positively in the plane of said marginal edge;

a second slider having an aperture therethrough of rectangular cross section and slidingly received on said first bar, said second slider having a vernier thereon cooperating with the scale on said first bar;

a second knurled set screw threadedly received in said second slider and bearing on said first bar to secure said second slider in any desired position on said first bar;

a second protractor, said second protractor being affixed to said second slider and having a scale reading from zero to 180°, said scale having a zero-180° line aligned with the scale on said first bar and having a threaded pivot post extending normal to the plane of said second protractor, the axis of said post forming a second pivotal axis parallel to said first pivotal axis;

a third elongated bar having a graduated scale thereon and having an angle vernier thereon cooperating with said second protractor, said third bar being pivotally mounted to said second slider on said post;

a second threaded knurled nut on said post and engaging spring friction clutch means to affix said second bar in any desired angular position with respect to said second slider and thereby with respect to said first bar, said first and second pivotal axes being perpendicular to and intersecting a line extending in the direction of relative movement of said second slider on said first bar;

a third slider having an aperture therethrough of rectangular cross section and slidingly received on said third bar, said third slider having a vernier thereon cooperating with the scale on said third bar, a third knurled set screw threadedly received in said third slider and bearing on said third bar to secure said third slider in any desired position on said second bar;

said third slider having an aperture therethrough precisely fitting said pin and located on a line extending in the direction of relative movement of said third slider on said third bar and through said second pivotal axis;

the scales on said bars being in identical units and the scales on said protractors being in identical units whereby problems in triangulation are workable by angular and linear positioning of said bars and sliders respectively.

2. An angulator comprising:

a first elongated bar of rectangular cross section having a graduated scale thereon;

a protractor affixed to said bar and having a zero angle line disposed parallel to the direction of increasing values on said scale and having a 90° angle line perpendicular thereto and intersecting the zero angle line at the center of the protractor, said protractor and bar scale being on upper faces of said protractor and bar;

a second elongated bar having a graduated scale thereon and having an angle vernier thereon cooperating with said protractor;

first pivotal mounting means pivotally mounting said second bar to said first bar, the first pivotal axis thereof being perpendicular to the plane of the radii of said protractor and intercepting the center line of said angle vernier and the center of said protractor, said pivotal mounting means including a first threaded pivot post affixed to said first bar and a threaded knurled nut threadedly received thereon engaging a spring friction clutch means to affix said first two bars in any angular relationship desired, said second bar having a straight flat marginal edge thereon lying in a plane containing said first pivotal axis, the scale graduations on said second bar beginning at zero on a line intersecting said pivotal axis and perpendicular to said edge;

a first slider having an aperture therethrough of rectangular cross section and slidingly received on said second bar, said first slider having a vernier thereon cooperating with the scale on said second bar and having an aperture therethrough having its axis on the zero line of the vernier of said slider and co-planar with said marginal edge of said second bar;

a pin extending through said aperture and slidingly received therein, said pin having a groove therein permitting movement of said slider with the pin therein linearly along said second bar, and said groove and second bar being of thicknesses permitting limited axial movement of said pin in said slider at all positions of said slider on said bar;

and locking means on said slider and bearing on said second bar opposite said flat marginal edge to secure said slider in any desired position on said second bar and locate the axis of said pin positively in the plane of said marginal edge;

a second slider having an aperture therethrough of rectangular cross section and slidingly received on said first bar, said second slider having a vernier thereon cooperating with the scale on said first bar;

a second locking means on said second slider and bearing on said first bar to secure said second slider in any desired position on said first bar;

a second protractor, said second protractor being affixed to said second slider and having a scale reading from zero to 180°, said scale having a zero-180° line aligned with the scale on said first bar and having a second threaded pivot post extending normal to the plane of said second protractor, the axis of said post forming a second pivotal axis parallel to said first pivotal axis;

a third elongated bar having a graduated scale thereon and having an angle vernier thereon cooperating with said second protractor, said third bar being pivotally mounted to said second slider on said post;

a second threaded knurled nut on said post and engaging spring friction clutch means to affix said second bar in any desired angular position with respect to said second slider and thereby with respect to said first bar, said first and second pivotal axes being perpendicular to and intersecting a line extending in the direction of relative movement of said second slider on said first bar;

a third slider having an aperture therethrough of rectangular cross section and slidingly received on said third bar, said third slider having a vernier thereon cooperating with the scale on said third bar, a third locking means on said third slider and bearing on said third bar to secure said third slider in any desired position on said second bar;

said third slider having a receiver therein precisely fitting said pin and located on a line extending in the direction of relative movement of said third slider on said third bar and through said second pivotal axis;

the scales on said bars being in identical units and the scales on said protractors being in identical units whereby problems in triangulation are workable by angular and linear positioning of said bars and sliders respectively.

3. An angulator comprising:

a first elongated bar having a graduated scale thereon;

a protractor affixed to said bar and having a center;

a second elongated bar having a graduated scale thereon and having an angle reference mark thereon cooperating with said protractor;

first pivotal mounting means pivotally mounting said second bar to said first bar, the first pivotal axis thereof passing through said center, said pivotal mounting means including locking means to affix said first two bars in any angular relationship desired, said second bar having a straight marginal edge thereon lying in a plane containing said first pivotal axis;

a first slider slidingly received on said second bar, said first slider having a reference mark thereon cooperating with the scale on said second bar and having an aperture therethrough having its axis on the zero line of the vernier of said slider and co-planar with said marginal edge of said second bar;

a pin extending through said aperture and slidingly received therein, said pin having a groove therein permitting movement of said slider with the pin therein linearly along said second bar, and said groove and second bar being of thicknesses permitting limited axial movement of said pin in said slider at all positions of said slider on said bar;

and locking means on said slider to secure said slider in any desired position on said second bar, and locate the axis of said pin positively in the plane of said marginal edge;

a second slider slidingly received on said first bar, said second slider having a reference mark thereon cooperating with the scale on said first bar;

a second locking means on said second slider to secure said second slider in any desired position on said first bar;

a second protractor affixed to said second slider and having a second pivotal mounting means thereon, the pivotal axis of said second pivotal mounting means being parallel to said first pivotal axis;

a third elongated bar having a graduated scale thereon and having an angle reference thereon cooperating with said second protractor, said third bar being pivotally mounted to said second slider by said second pivotal mounting means;

second locking means to affix said second bar in any desired angular position with respect to said second slider and thereby with respect to said first bar, said first and second pivotal axes being perpendicular to and intersecting a line extending in the direction of relative movement of said second slider on said first bar;

a third slider slidingly received on said third bar, said third slider having a reference mark thereon cooperating with the scale on said third bar;

and a third locking means on said third slider to secure said third slider in any desired position on said second bar;

said third slider having a receiver therein precisely fitting said pin and located on a line extending in the direction of relative movement of said third slider on said third bar and through said second pivotal axis.

4. An angulator comprising:
a first elongated bar having a graduated scale thereon and a first straight guide edge;
a first protractor affixed to said bar and having its center aligned with the origin of said scale;
a second elongated bar having a second graduated scale thereon and a second straight guide edge, the origin of said second scale being aligned with said center;
first pivotal mounting means having a first axis through said protractor and perpendicular to the reading plane of the protractor, said first mounting means pivotally mounting said second bar to said first bar for rotation on said axis, said second bar having an angle vernier thereon cooperating with said first protractor to show the angle between said first and second guide edges, said pivotal mounting means having a friction means adjustable to secure said first and second bars at any desired angular relationship;
a first slider having an opening therethrough slidingly received on said second bar, said opening including a guide face engaging said second straight guide edge, and said slider having a vernier thereon cooperating with said second scale, and said slider having a locating pin movably mounted thereon with an axis parallel to said first axis and co-planar with said second edge and intercepting said first axis;
means on said first slider for securing said first slider to said second bar;
a second slider having an opening therethrough slidingly received on said first bar, said opening including a guide face engaging said first straight guide edge, and said second slider having a vernier thereon cooperating with said first scale;
means on said second slider for securing said second slider to said first bar;
a second protractor affixed to said second slider and having its center on a second axis normal to a line extending through the center of said first protractor and parallel to said first guide edge;
a third elongated bar having a third graduated scale thereon and a third straight guide edge, the origin of the scale thereon being aligned with the center of said second protractor, and said third bar having a vernier thereon cooperating with said second protractor;
second pivotal mounting means having an axis colinear with said second axis and pivotally mounting said third bar to said second slider and having adjustable friction means to secure said third bar to said second slider to establish any desired angular relationship between said third bar and said first bar;
and a third slider having an opening therethrough slidingly received on said third bar, said opening including a guide face engaging said third straight guide edge, said third slider having a vernier thereon cooperating with said third scale, and said third slider having an aperture thereon aligned with said vernier thereof and fittingly receiving said pin to locate a vertex of triangle formed by the pin axis and said first and second axes and the portions of the said bars extending therebetween;
and means on said third slider for securing said third slider to said second bar.

5. An angulator comprising:
a first elongated bar having a graduated scale thereon and a first straight guide edge;
a first protractor affixed to said bar and having its center aligned with a reference mark on said scale;
a second elongated bar having a second graduated scale thereon and a second straight guide edge, a reference mark on said second scale being aligned with said center;
first pivotal mounting means having a first axis through the center of said protractor, said first mounting means pivotally mounting said second bar to said first bar for rotation on said axis, said second bar having an angle vernier thereon cooperating with said first protractor to show the angle between said first and second guide edges, said pivotal mounting means having a friction means adjustable to secure said first and second bars at any desired angular relationship;
a first slider having an opening therethrough slidingly received on said second bar, said opening including a guide face engaging said second straight guide edge, and said slider having a vernier thereon cooperating with said second scale, and said slider having a locating pin movably mounted thereon with an axis parallel to said first axis and co-planar with said second edge;
means on said first slider for securing said first slider to said second bar;
a second slider having an opening therethrough slidingly received on said first bar, said opening including a guide face engaging said first straight guide edge, and said second slider having a vernier thereon cooperating with said first scale;
means on said second slider for securing said second slider to said first bar;
a second protractor affixed to said second slider and having its center on a second axis normal to a line extending through the center of said first protractor and parallel to said first guide edge;
a third elongated bar having a third graduated scale thereon and a third straight guide edge, a reference mark on the scale thereon being aligned with the center of said second protractor, and said third bar having a vernier thereon cooperating with said second protractor;
second pivotal mounting means having an axis colinear with said second axis and pivotally mounting said third bar to said second slider and having adjustable friction means to secure said third bar to said second slider to establish any desired angular relationship between said third bar and said first bar;
and a third slider having an opening therethrough slidingly received on said third bar, said opening including a guide face engaging said third straight guide edge, said third slider having a vernier thereon cooperating with said third scale, and said third slider having a receiver thereon aligned with said vernier thereof and fittingly receiving said pin to locate a vertex of triangle formed by the pin axis and said first and second axes and the portions of the said bars extending therebetween;
and means on said third slider for securing said third slider to said second bar.

6. An angulator comprising:
a first elongated bar having a graduated scale thereon and a first straight guide means;
a first protractor affixed to said bar and having its center aligned with a reference mark on said scale;
a second elongated bar having a second graduated scale thereon and a second straight guide means, a reference mark on said second scale being aligned with said center;
first pivotal mounting means having a first axis through the center of said protractor, said first mounting means pivotally mounting said second bar to said first bar for rotation on said axis, said second bar having an angle reference mark thereon cooperating with said first protractor to show the angle between said first and second guide means, said pivotal mounting means having a means adjustable to secure said first and second bars at any desired angular relationship;
a first slider slidingly received on said second bar, said slider including a guide surface engaging said second straight guide means, and said slider having a reference mark thereon cooperating with said second scale, and said slider having a locating pin thereon with an axis parallel to said first axis and intercepting a line which is parallel to said second guide means and intercepts said first axis;

means on said first slider for securing said first slider to said second bar;

a second slider slidingly received on said first bar, said second slider including a guide surface engaging said first straight guide means, and said second slider having a reference mark thereon cooperating with said first scale;

means on said second slider for securing said second slider to said first bar;

a second protractor affixed to said second slider and having its center on a second axis normal to a line extending through the center of said first protractor and parallel to said first guide means;

a third elongated bar having a third graduated scale thereon and a third straight guide means, a reference mark on the scale thereon being aligned with the center of said second protractor, and said third bar having a vernier thereon cooperating with said second protractor;

second pivotal mounting means having an axis colinear with said second axis and pivotally mounting said third bar to said second slider and having adjustable means to secure said third bar to said second slider to establish any desired angular relationship between said third bar and said first bar;

and a third slider slidingly received on said third bar, said third slider including a guide surface engaging said third straight guide means, said third slider having a reference mark thereon cooperating with said third scale, and said third slider having a receiver thereon aligned with said vernier thereof and fittingly receiving said pin to locate a vertex of triangle formed by the pin axis and said first and second axes and the portions of the said bars extending therebetween;

and means on said third slider for securing said third slider to said second bar.

No references cited.

ISAAC LISANN, *Primary Examiner*.